Nov. 19, 1935.  E. A. SANTON  2,021,432
LOOM TAKE-UP MECHANISM
Filed Aug. 7, 1934  2 Sheets-Sheet 2
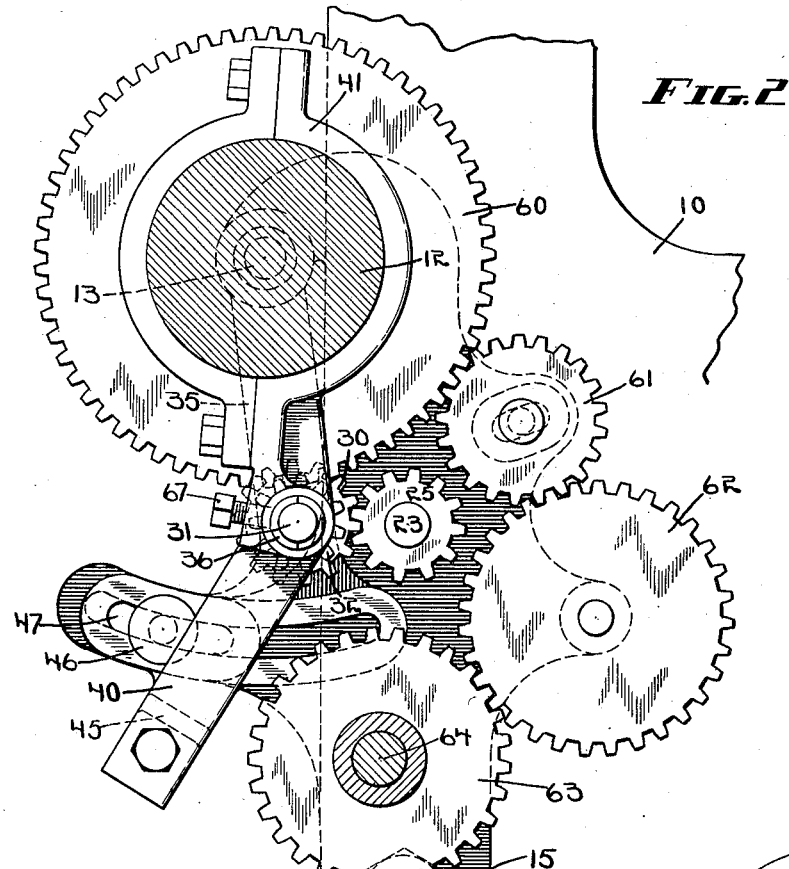
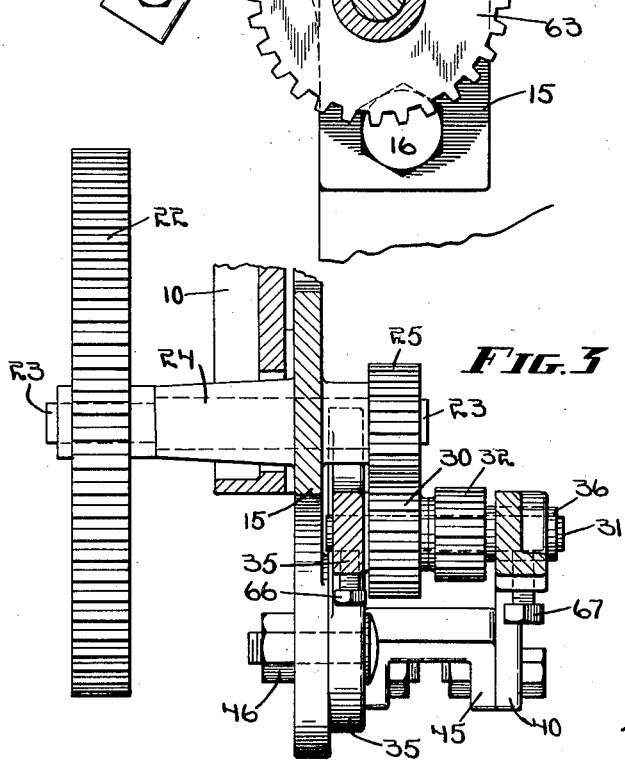
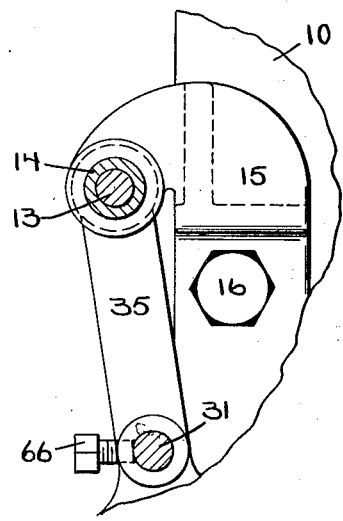
Inventor
Elliot A. Santon
Attorneys Patented Nov. 19, 1935

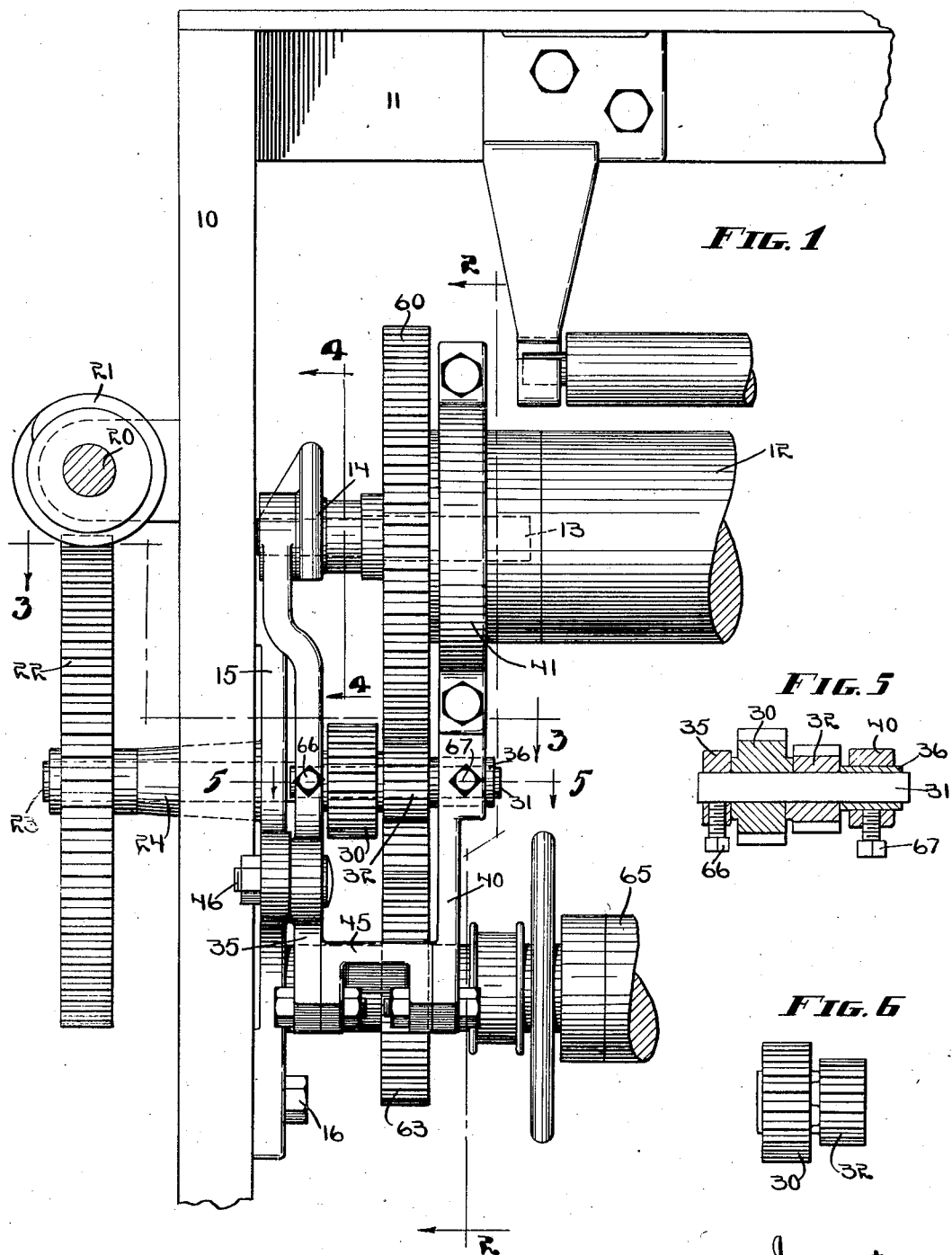

2,021,432

UNITED STATES PATENT OFFICE 2,021,432

LOOM TAKE-UP MECHANISM

Elliot A. Santon, Worcester, Mass., assignor to Crompton & Knowles Loom Works, Worcester, Mass., a corporation of Massachusetts Application August 7, 1934, Serial No. 738,839

6 Claims. (Cl. 139—309)

This invention relates to mechanism for taking up the cloth as it is produced in a power loom. My improvements relate more particularly to looms for weaving wide or heavy cloth, in which the take-up mechanism operates against considerable resistance.

It is the general object of my invention to provide an improved construction of take-up mechanism by which more positive and satisfactory operation is obtained and by the use of which wear and breakage of parts is substantially reduced.

My invention further relates to arrangements and combinations of parts which will be hereinafter described and more particularly pointed out in the appended claims.

A preferred form of the invention is shown in the drawings, in which

Fig. 1 is a front elevation of parts of a loom embodying my improvements;

Fig. 2 is a right-hand sectional side elevation, taken along the line 2—2 in Fig. 1;

Fig. 3 is a sectional plan view, taken along the line 3—3 in Fig. 1;

Fig. 4 is a detail sectional elevation, taken along the line 4—4 in Fig. 1;

Fig. 5 is a detail sectional plan view, taken along the line 5—5 in Fig. 1, and

Fig. 6 is a side elevation of certain gears to be described.

Referring to Fig. 1, I have shown portions of a loom frame 10 and breast beam 11. A take-up roll 12 has a gudgeon 13 rotatable in a bearing 14 in a plate 15 secured to the loom side 10 by bolts 16. A driven shaft 20 is rotatable in fixed bearings and is provided with a worm 21 meshing with a worm wheel 22 mounted on a short shaft 23 which is rotatable in an elongated bearing 24 (Fig. 3), preferably formed integral with the plate 15.

A pinion 25 (Fig. 3) is secured to the inner end of the shaft 23 and engages a change gear 30 loosely rotatable on a stud 31. A pinion 32 is likewise rotatable on the stud 31, and the change gear 30 and pinion 32 are provided with interlocking side or hub portions as shown in Fig. 6, so that the gear and pinion will rotate together when assembled on the stud 31.

One end of the stud 31 extends through an opening in a support 35 (Fig. 2) mounted to swing about the axis of the take-up roll gudgeon 13. The opposite end of the stud 31 extends through a split bushing 36 axially slidable in an opening in a second swinging support 40. The second support 40 is enlarged at its upper end and is provided with a split bearing portion 41 (Fig. 2) which encircles an end portion of the take-up roll 12.

The lower end of the support 40 is secured to the support 35 by a spacing block 45 by which the swinging supports 35 and 40 are held rigidly together but at a definite distance apart. The parts 35 and 40 are thus mounted to swing as a unit about the axis of the take-up roll 12 and its concentric gudgeon 13. The support 35 is provided with a clamping bolt 46 extending through a segmental slot 47 formed in the bearing plate 15.

By swinging the supports 35 and 40 toward or away from the take-up roll axis, a change gear 30 of any desired number of teeth may be caused to mesh with the pinion 25. The pinion 32 rotates with the change gear 30 and drives a large gear 60 secured to the end of the take-up roll 12, which roll is thus positively rotated at a predetermined speed.

The gear 60 also operates through intermediate gears 61 and 62 to drive a gear 63 on the gudgeon 64 of a lower or winding roll 65 to which the cloth is delivered from the take-up roll 12.

When it is necessary to change the gear ratio for the take-up roll, the bolt 46 is loosened, the supports 35 and 40 are swung forward, set screws 66 and 67 are loosened to free the stud 31, and the stud is thereafter removed axially to permit one change gear 30 to be removed and another to be substituted therefor.

The stud 31 is then replaced, the set screw 66 is tightened, and the split bushing 36 is pushed inward against the side of the pinion 32, causing the pinion 32 to closely engage the adjacent side of the change gear 30.

The set screw 67 is then tightened, holding the gear 30 and pinion 32 in driving engagement, after which the supports 35 and 40 are swung backward to properly mesh the new change gear 30 with the driving pinion 25. The bolt 46 is then again tightened.

I thus provide a firm and rigid supporting structure for the stud 31, adjustable for any size change gear and the stud 31 is firmly held in position by bearings at both ends of the stud. Furthermore, the split bushing 36 provides for taking up variations in the axial length of different change gears, and causes the pinion 32 to closely engage whatever change gear 30 is in use.

My improved firm and rigid support for the change gear and pinion is found to substantially reduce the wear on the teeth and driving lugs, and to largely prevent a substantial amount of tooth and lug breakage which has previously occurred.

Having thus described my invention and the advantages thereof, I do not wish to be limited to the details herein disclosed, otherwise than as set forth in the claims, but what I claim is:—

1. In a loom take-up mechanism, a change gear, a stud on which said gear is rotatably mounted, a swinging support for one end of said stud, a second swinging support for the other end of said stud, means to secure said supports in rigid spaced relation, and means to secure said supports as a unit in selected angular position.

2. In a loom take-up mechanism, a change gear, a stud on which said gear is rotatably mounted, a swinging support for one end of said stud, a second swinging support for the other end of said stud, means to secure said supports in rigid spaced relation, the axes of said two supports being coincident and said supports swinging as a unit about said axes, and means to secure said supports in selected angular position.

3. In a loom take-up mechanism, a change gear, a stud on which said gear is rotatably mounted, a swinging support for one end of said stud, a second swinging support for the other end of said stud, a pinion on said stud, said pinion and change gear having intermeshing side portions, a split bushing mounted in one of said supports and forming a bearing for one end of said stud, said bushing being slidable axially on said stud to engage an outer side of the assembled change gear and pinion, and means to clamp said split bushing on said stud and in said support.

4. In a loom take-up mechanism, a change gear, a pinion rotatable therewith, a stud on which said gear and pinion are freely rotatable, a pair of swinging supports rigidly secured in spaced relation, means to secure said combined supports in a selected angular position, bearings in said supports for the two ends of said stud, and means to secure said stud in said bearings.

5. In a loom take-up mechanism, a change gear, a pinion rotatable therewith, a stud on which said gear and pinion are freely rotatable, a bearing for one end of said stud, means to secure said stud in said bearing, a split bushing for the other end of said stud slidable axially thereon to engage a side of an assembled change gear and pinion, a support for said bushing, and means to secure said split bushing in said support and on said stud.

6. In a loom having a take-up roll and gudgeon, in combination, a change gear, a support mounted to swing about the axis of said gudgeon, a second change gear support mounted to turn on the periphery of said take-up roll and concentric with said first support, means to secure said supports together to swing as a unit, means to secure said combined supports in a selected angular position, and means to rotatably mount a change gear in said combined supports.

ELLIOT A. SANTON.